(No Model.)  2 Sheets—Sheet 1.
J. E. WRIGHT.
ROTARY SICKLE.
No. 468,859. Patented Feb. 16, 1892.
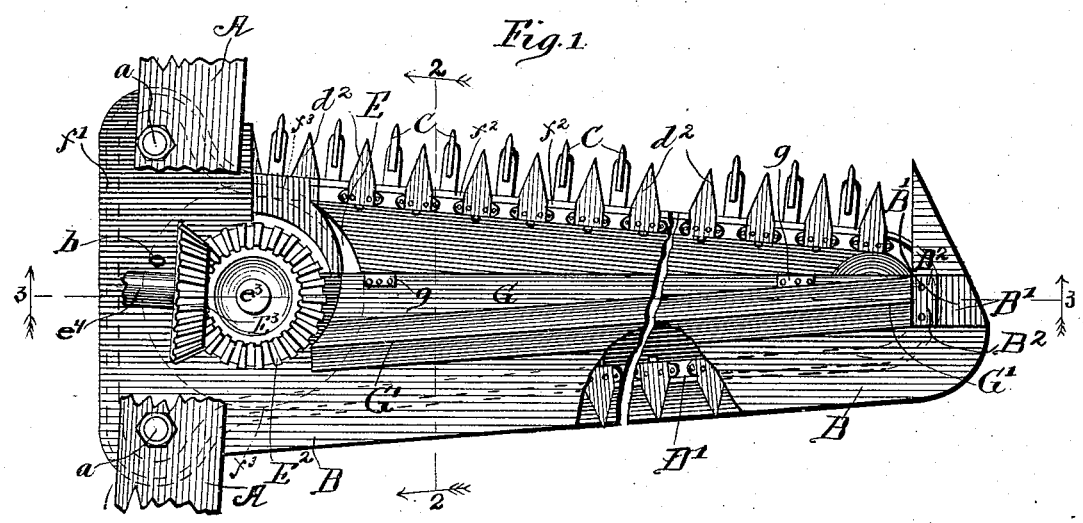
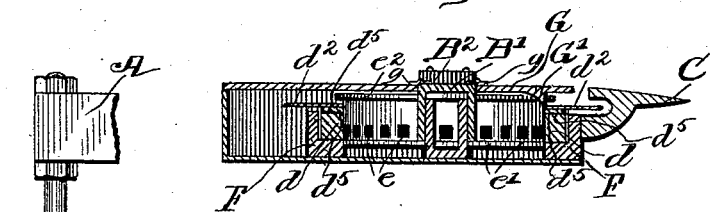
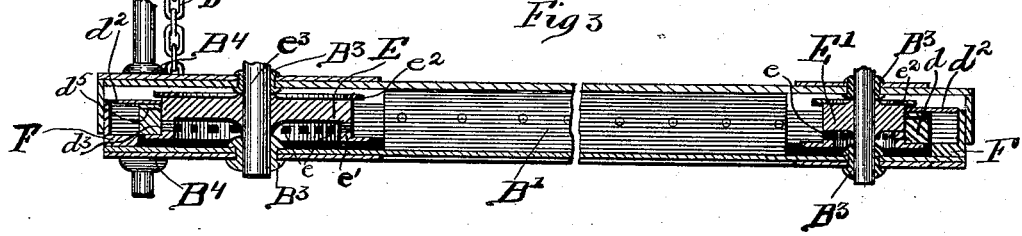
Witnesses:
Lute S. Alter.
Tessa G. Parrish.
Inventor:
Judson E. Wright
By Charles J. Brown,
Atty.

(No Model.) 2 Sheets—Sheet 2.
J. E. WRIGHT.
ROTARY SICKLE.
No. 468,859. Patented Feb. 16, 1892.
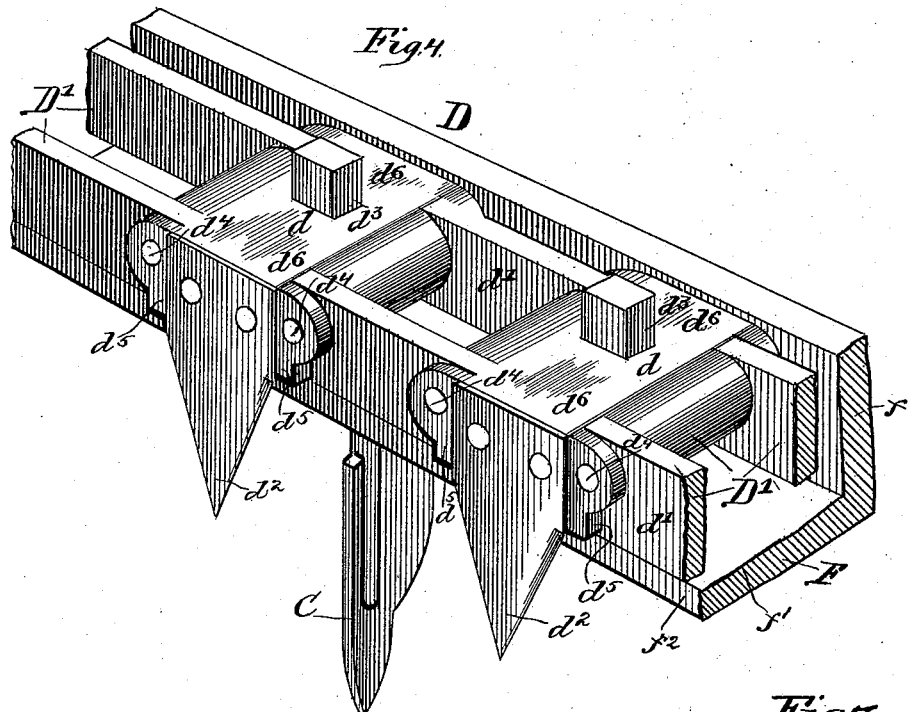
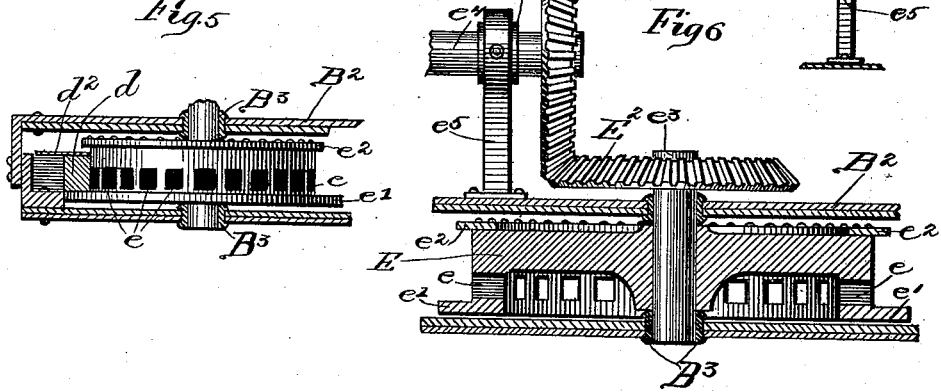
Witnesses:
Lute S. Alter
Tessa G. Parrish
Inventor;
Judson E. Wright,
By Charles T. Brown,
Atty.

UNITED STATES PATENT OFFICE.

JUDSON E. WRIGHT, OF CHICAGO, ILLINOIS, ASSIGNOR OF ONE-HALF TO WILLIAM B. MOORE, OF SAME PLACE.

ROTARY SICKLE.

SPECIFICATION forming part of Letters Patent No. 468,859, dated February 16, 1892.

Application filed January 19, 1891. Serial No. 378,248. (No model.)

*To all whom it may concern:*

Be it known that I, JUDSON E. WRIGHT, a citizen of the United States, residing at Chicago, in the county of Cook and State of Illinois, have invented certain new and useful Improvements in Rotary Sickles, of which the following is a specification.

My invention relates to that class of sickles employed upon reaping-machines for the purpose of cutting grain to be delivered therefrom upon a table whereon it is bound into sheaves of the ordinary kind and upon mowing-machines for cutting grass.

The object of this invention is to obtain a sickle having a continuous rotary movement and suitable to be substituted with the frame therefor on an ordinary reaping or mowing machine in place of a vibratory sickle, and adapted, when placed on a reaping-machine, to cut grain to be thereafter delivered on the binding-table of the machine and bound in sheaves as heretofore, and when placed on a mowing-machine to cut grass in the ordinary way.

I have illustrated my invention by the drawings accompanying and forming a part of this specification, in which—

Figure 1 is a plan view of a sickle-bar frame having a rotary sickle therein, with the hinged cover of the frame thrown back, exposing to view such rotary sickle in the front part of the sickle-frame, and with a portion of the top of the sickle-frame broken away in the back part thereof, exposing to view the rotary sickle in that part of such frame; Fig. 2, a cross-sectional view of the rotary sickle and frame on line 2 2 of Fig. 1; Fig. 3, a longitudinal sectional view thereof on line 3 3 of Fig. 1; Fig. 4, a perspective view of a small portion of the rotary sickle and of the support on which it moves, viewed in a position to exhibit the construction thereof; Fig. 5, an elevation of the driving-wheel of the rotary sickle with the frame in which the wheel is rotatably held shown in section; Fig. 6, a sectional view of such driving-wheel and an elevation of the intermeshing cog-wheels whereby such driving-wheel is actuated, and Fig. 7 is a sectional view of the horizontal shaft actuating the rotary sickle and a front elevation of the journal-bearing in which it rotates.

Like letters refer to the same parts throughout the different views thereof.

A is the side bar of the sulky-frame of a reaper, and $a\ a$ are vertical rods rigidly secured in side bar A.

B is the frame of the rotary sickle.

$b$ is a chain secured to the frame B and extending therefrom to the side bar A of the sulky-frame. By means of the chain $b$ the frame B is raised or lowered upon the rods $a\ a$ in the ordinary manner in which sickle-bar frames are raised and lowered in reapers as heretofore constructed.

B' is a hollow truss or beam extending longitudinally in the frame B and designed to strengthen and stiffen the frame.

$B^2$ is a strip of iron riveted to hollow beam B' on the top face thereof. The top and bottom members of hollow truss B' extend the entire length of the frame B, and, combined with the strengthening-strip $B^2$, constitute the frame in which are placed the journals $B^3$ $B^3$ of a driving and driven wheel of the rotary sickle, hereinafter described.

$B^4\ B^4$ are sliding journal-bearings in frame B for rods $a\ a$.

C C are the fingers of the frame B.

D is the rotary sickle, and is composed of endless chain D' and knives $d^2\ d^2$. The chain D' is composed of the links $d\ d'$, joined together by the rivet $d^4$. The cutting-knives $d^2$ are secured upon the upper edge of links $d$ of the chain. $d^3$ is a projection upon the back of link $d$.

$d^5$ is a projecting rib on the upper front portion of link $d$. The under surface of this projection $d^5$ on link $d$ is in contact, or nearly so, with the upper face $f^2$ of the vertical part $f'$ of the angle-iron F, hereinafter described.

$d^6$ is the rear surface or face of link $d$.

E is a driving-wheel, and E' is a driven wheel—that is, a loose wheel at the outer end of the sickle-frame B—over which rotary sickle D passes.

$e\ e$ are holes in driving-wheel E and in driven wheel E'. Into these holes $e\ e$ the projections $d^3$ of the rotary sickle D mesh as the wheels E E' revolve, and such rotary sickle is thereby actuated.

$e'$ is a rim around the lower edge of the wheels E E', and on this rim the lower edge of the rotary reaper-sickle D rests.

$e^2$ is a small projecting rim around the upper edge of the wheels E E'.

$E^2$ is a beveled gear-wheel rigidly secured on the shaft $e^3$, to which shaft is also secured the driving-wheel E, and $E^3$ is a beveled gear-wheel rigidly secured on shaft $e^4$, intermeshing with beveled gear-wheel $E^2$. The shaft $e^4$ is rotatable in journal-bearings secured in the frame of the reaper in the ordinary manner, and is rotated by the driving-wheel of the reaper in the same manner in which such shafts have been heretofore rotated in reapers through gearing interposed between the shaft $e^4$ and the driving-wheel of the reaper, and adapted to give the proper speed to shaft $e^4$.

$e^5$ is a standard secured to the frame B, and supporting by screws $e^6$ the journal-box $e^7$, in which the shaft $e^4$ is rotatably held. The other end of the shaft $e^4$ is held in a like bearing, the standard whereof is secured to the sulky-frame of the reaper.

The upward and downward movement in the frame B required in operating the machine is not so great as to so change the position, in the elevating and depressing thereof, of the teeth of the wheels $E^2$ $E^3$ relative to each other as to prevent their proper intermeshing.

The rotary movement of the wheel E is to the left or contrary to the direction in which the hands of a clock move, and the knives $d^2$ of the sickle D are thereby moved toward the left upon the front and cutting portion of the sickle.

F is a bar of angle-iron, which extends entirely around the sickle-frame B. $f$ is the horizontal portion of this angle-iron F, and $f'$ is the vertical portion thereof.

$f^3$ indicates where a portion of the horizontal part $f$ of the angle-iron F is cut away to allow the flange $e'$ of the wheel E to turn in position to receive the rotary sickle D (see Fig. 1) from the angle-iron F.

That portion of the angle-iron F which extends between the wheels E E' serves as support for the rotary sickle, the lower edge of the link $d$ of the rotary sickle resting upon or nearly upon the upper face of the horizontal part $f$ of such angle-iron F.

$f^2$ is the upper face of the vertical part $f'$ of the angle-iron F.

G is a hinged lid secured by hinges $g$ $g$ to hollow beam B' of the sickle-frame B.

G' is a projection on the under side of the lid G when such lid is closed, extending down back of the rotary sickle D and in contact, or nearly so, with the rear surface $d^6$ of the link $d$ of said rotary sickle. This projection G', when in contact with the rear face of the link $d$, as described, serves as a backing for the rotary sickle D, the link $d$ thereof being pressed backward against the projection G' when the reaper is in operation and knives $d^2$ are cutting grain.

The operation of this device is as follows:

The shaft $e^4$, with geared wheel $E^3$ thereon, is rotated to the left by the driving-wheel of the reaper as the reaper is hauled over the field, thereby rotating the wheel $E^2$ and shaft $e^3$ at a suitable rate of speed to the left, thus turning the driving-wheel E to the left. Some of the cogs $d^3$ of the rotary sickle D being in holes $e$ of the wheel E, the rotary sickle D is thereby actuated and the knives $d^2$ thereon moved at right angles to the lines in which the reaper is being hauled and in toward the reaper—that is, to the left—at the same rate of speed the periphery of the wheel E is moving. A continuous movement to the left of the knives $d^2$ is thus obtained between the fingers C of the machine in place of the vibratory movement of such knives that has heretofore been obtained, and thereby the severe racking strain imposed upon the sickle-bar frame is obviated.

By placing the projections $d^3$ upon the back face of the links of the chain D', and placing the holes $e$ in the periphery of the driving-wheel E, into which holes the projections $d^3$ enter as the wheel E is turned, I am enabled to attain much greater speed in the movement of the wheel E and chain D', and with less friction and noise than can be attained where projections are placed upon the driving or driven wheel and corresponding holes in the driving-chain in the ordinary way, and thus I am able to drive the rotary sickle D at a high rate of speed and obtain results otherwise not possible.

Having thus described my invention, what I claim as new, and desire to secure by Letters Patent of the United States, is—

1. A sickle-frame having an angle-iron extending along the front and back thereof, horizontal rotatable wheels, holes in the periphery of the wheels, and a projecting rim on the lower edge thereof extending into the plane of the horizontal web of the angle-irons, and a rotary sickle consisting of an endless chain having sickle-knives secured on the upper edge of the alternate links thereof, such endless chain extending around the rotatable wheels and along the angle-iron between such wheels and consisting of links pivotally connected together, projections on the back of the alternate links of the chain adapted to intermesh with the holes in the rotatable wheels, and a projecting rim on the face of such alternate links at the upper edge thereof and extending over and adapted to rest upon the upper face of the vertical web of the angle-iron, substantially as described.

2. A sickle-frame having an angle-iron extending along the front and back thereof, horizontal rotatable wheels, holes in the periphery of the wheels, and a projecting rim on the lower edge thereof extending into the plane of the horizontal web of the angle-irons, and a rotary sickle consisting of an endless chain having knives secured on the upper edge of the alternate links thereof, such endless chain extending around the rotatable wheels and along the angle-iron between such wheels and consisting of links pivotally connected together and projections on the back of the alternate links of the chain adapted to intermesh with the holes in the rotatable wheels, substantially as described.

JUDSON E. WRIGHT.

Witnesses:
WM. B. MOORE,
CHARLES T. BROWN.